(12) United States Patent
Alcantara et al.

(10) Patent No.: US 11,100,957 B2
(45) Date of Patent: Aug. 24, 2021

(54) METHOD AND SYSTEM FOR EXPORTING VIDEO

(71) Applicant: AVIGILON CORPORATION, Vancouver (CA)

(72) Inventors: Tulio de Souza Alcantara, Vancouver (CA); David Flanagan, Galway (IE); Zachary Lang, Vancouver (CA); Brady James Schnell, Burnaby (CA); Brenna Randlett, Vancouver (CA)

(73) Assignee: AVIGILON CORPORATION

( * ) Notice: Subject to any disclaimer, the term of this patent is extended or adjusted under 35 U.S.C. 154(b) by 0 days.

(21) Appl. No.: 16/994,401

(22) Filed: Aug. 14, 2020

(65) Prior Publication Data

US 2021/0050035 A1 Feb. 18, 2021

Related U.S. Application Data

(60) Provisional application No. 62/887,494, filed on Aug. 15, 2019.

(51) Int. Cl.
*G11B 27/30* (2006.01)
*G11B 27/031* (2006.01)
*H04N 7/18* (2006.01)

(52) U.S. Cl.
CPC .......... *G11B 27/309* (2013.01); *G11B 27/031* (2013.01); *H04N 7/181* (2013.01)

(58) Field of Classification Search
CPC ..... G11B 27/309; G11B 27/031; H04N 7/181
See application file for complete search history.

(56) References Cited

U.S. PATENT DOCUMENTS

| | | |
|---|---|---|
| 5,237,648 A | 8/1993 | Mills et al. |
| 6,587,123 B2 | 7/2003 | Ando et al. |
| 2010/0002082 A1* | 1/2010 | Buehler .......... G08B 13/19693 348/159 |
| 2017/0140620 A1* | 5/2017 | Vanchev ................ G08B 25/08 |
| 2017/0364747 A1* | 12/2017 | Ekambaram ....... G06K 9/00671 |

* cited by examiner

*Primary Examiner* — Mishawn N. Hunter
(74) *Attorney, Agent, or Firm* — Daniel Hammond

(57) ABSTRACT

A method of exporting video clips is provided, comprising: displaying one or more video streams from at least one security camera; selecting a video clip from a video stream of the one or more video streams, the video clip associated with a time; storing information associated with the video clip in a list of video clips, the information associated with the video clip comprising a default name, the time and a default duration of the video clip and a camera from the at least one security camera that is associated with the video stream from the one or more video streams; displaying the list of video clips; on selection of one or more video clips from the list of video clips, allowing editing of the time and the default duration of the selected one or more video clips; and exporting the selected one or more video clips to a file.

12 Claims, 13 Drawing Sheets

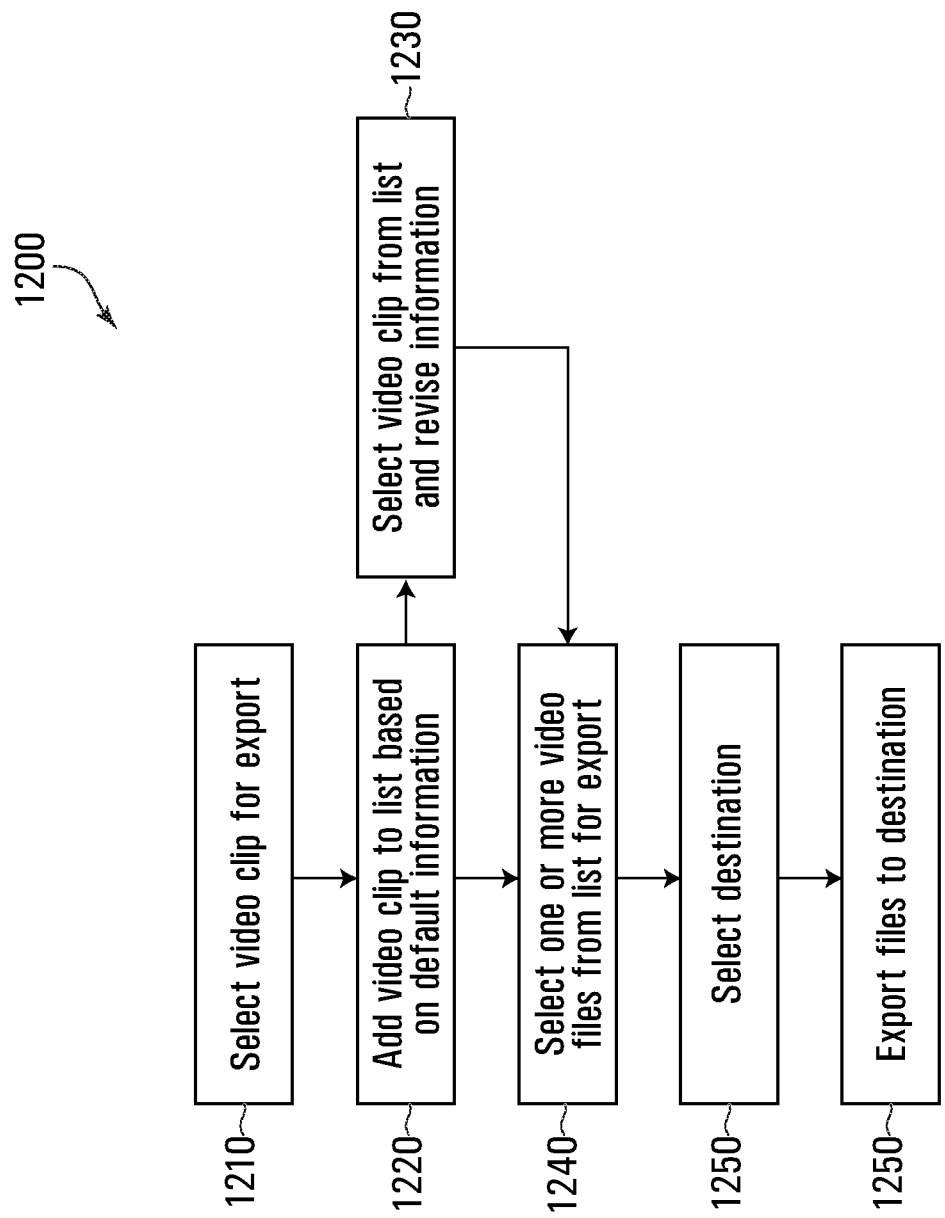

METHOD AND SYSTEM FOR EXPORTING VIDEO

RELATED APPLICATIONS

This application claims the benefit of U.S. Provisional Patent Application No. 62/887,494, filed on Aug. 15, 2019, which is hereby incorporated by reference in its entirety.

BACKGROUND

In many video security systems, multiple cameras simultaneously generate video streams, and, in each video stream, one or more events may be detected. For example, objects such as people or vehicles may be present and may be detected by a camera using video analytics. In addition, the objects may be performing actions that are suspicious, such as moving in areas they do not have permission to access. For instance, a person within a restricted location may be detected by a camera. The detection of the person in the restricted location may trigger an alarm and may require further investigation. For example, security personnel may be alerted to the potential security breach. On the other hand, the objects may be performing actions that are not suspicious and that, while still being detected by one or more cameras, do not require further investigation. For example, a person may be moving along a hallway of a building which they are authorized to access.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 5 is an illustration of a display showing the selection of a recorded video stream for export; according to an example embodiment.

FIG. 9 is an illustration of a display showing a history of viewed recorded video according to an example embodiment.

FIG. 12 is a flow chart showing the process by which video clips are selected and exported according to an example embodiment.

Figure 1:
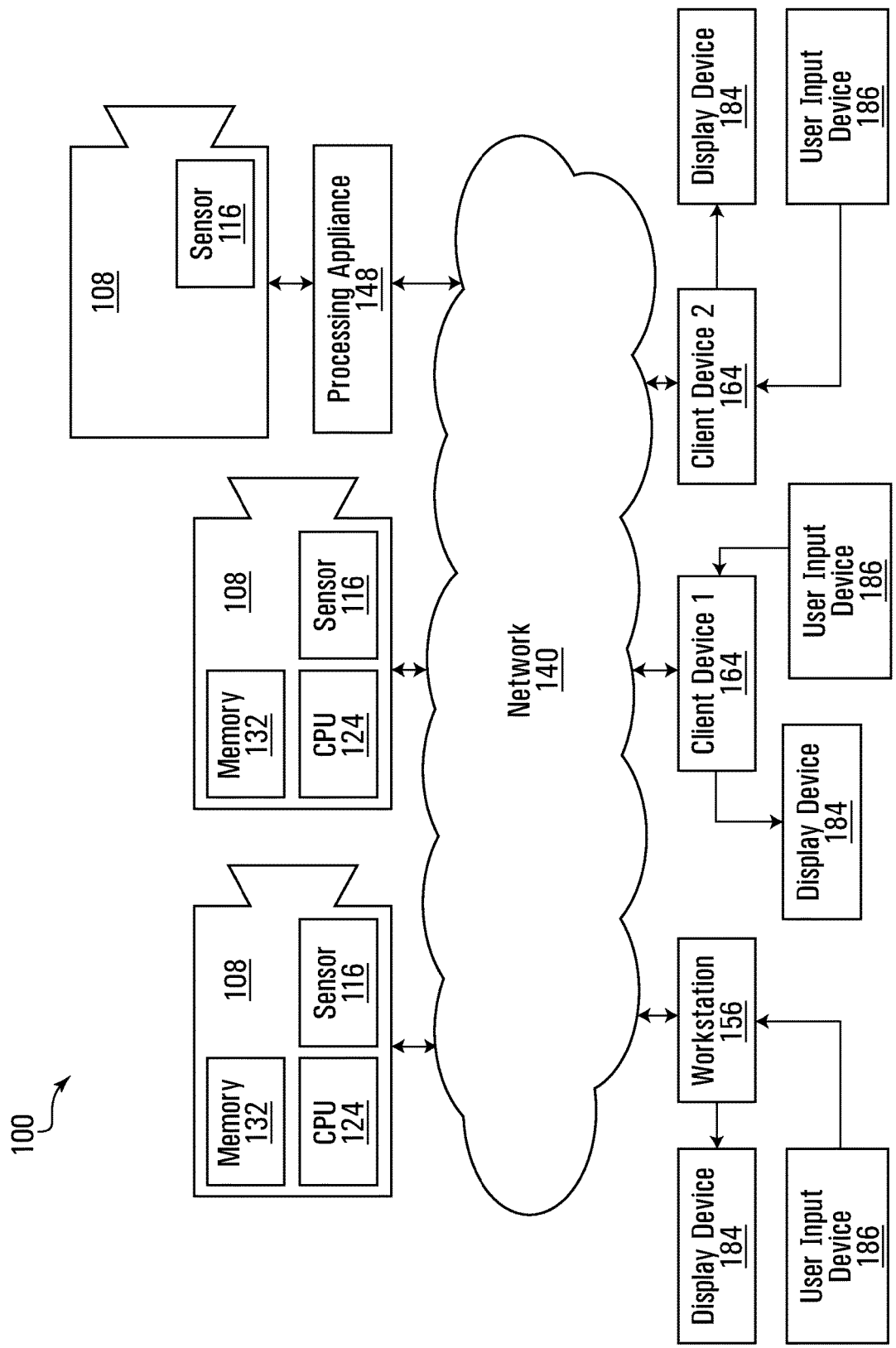
FIG. 1 is a block diagram of connected devices of a video capture and playback system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In order to handle large numbers of detected events, video streams capturing the events are typically shown on a display for review by an operator. The operator may want to select portions of live or recorded video streams for export to a folder or file for later access. However, with many different events being detected, as well as differences in the priorities of detected events, it can be difficult for operators to efficiently select portions of the video stream and assign the portions a file or folder. Thus there exists a need for an improved technical method, device, and system for exporting video.

In accordance with one example embodiment a method of exporting one or more video clips, comprising: displaying one or more video streams from at least one security camera; selecting a video clip from a video stream of the one or more video streams, the selected video clip associated with a time; storing information associated with the selected video clip in a list of video clips, the information associated with the video clip comprising a default name, the time and a default duration of the video clip and a camera from the at least one security camera that is associated with the video stream from the one or more video streams; displaying the list of video clips; on selection of one or more video clips from the list of video clips, allowing editing of the time and the default duration of the selected one or more video clips; and exporting the selected one or more video clips to a file.

The selected video clip from the video stream of the one or more video streams may be a snapshot from the video stream from the one or more video streams, the snapshot having a duration of zero. The information associated with the selected video clip may be changed on selection of the video stream from the one or more video streams. The selection of the video clip from the video stream of the one or more video streams may comprise selecting a display of the video stream. The selection of the video clip from the video stream of the one or more video streams may comprise selecting a timeline associated with the video stream.

In accordance with another example embodiment a system is provided comprising: one or security cameras; and one or more processors communicative with memory having stored thereon computer program code configured when executed by the one or more processors to cause the one or more processors to perform a method comprising: displaying one or more video streams from at least one security camera; selecting a video clip from a video stream of the one or more video streams, the video clip associated with a time; storing information associated with the selected video clip in a list of video clips, the information associated with the video clip comprising a default name, the time and a default duration of the video clip and a camera from the at least one security camera that is associated with the video stream from the one or more video streams; displaying the list of video clips; on selection of one or more video clips from the list of video clips, allowing editing of the time and the default duration of the selected one or more video clips; and exporting the selected one or more video clips to a file.

In accordance with another example embodiment a computer-readable medium is provided having stored thereon computer program code configured when executed by one or more processors to cause the one or more processors to perform a method comprising: displaying one or more video streams from at least one security camera; selecting a video clip from a video stream of the one or more video streams, the selected video clip associated with a time; storing information associated with the selected video clip in a list of video clips, the information associated with the video clip comprising a default name, the time and a default duration of the video clip and a camera from the at least one security camera that is associated with the video stream from the one or more video streams; displaying the list of video clips; on selection of one or more video clips from the list of video clips, allowing editing of the time and the default duration of the selected one or more video clips; and exporting the selected one or more video clips to a file.

Each of the above-mentioned embodiments will be discussed in more detail below, starting with example system and device architectures of the system in which the embodiments may be practiced, followed by an illustration of processing blocks for achieving an improved technical method, device, and system for exporting video.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

More generally, the system may be configured to perform any of the foregoing aspects of the method or suitable combinations thereof.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

This summary does not necessarily describe the entire scope of all aspects. Other aspects, features, and advantages will be apparent to those of ordinary skill in the art upon review of the following description of specific embodiments.

There is an application wide queue that users can add clips of interest to it without disrupting their context. The clip will be added on the background (with some non-intrusive notification) and users can access the queue later, to handle their clips (for example, export them, share, edit, bookmark).

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

Herein, an image may include a plurality of sequential image frames, which together form a video captured by the video capture device. Each image frame may be represented by a matrix of pixels, each pixel having a pixel image value. For example, the pixel image value may be a numerical value on grayscale (e.g., 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames, or for indexing image data in a database with respect to interpretable properties of detected objects such as their colors, categories as persons or vehicles, vehicle make or model, or human demographic information.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit", "module", or "system". Furthermore, the various example embodiments may take the form of a computer program product on a computer-usable storage medium having computer-usable program code embodied in the medium.

Further advantages and features consistent with this disclosure will be set forth in the following detailed description, with reference to the figures.

Referring now to the drawings, and in particular FIG. 1, therein illustrated is a block diagram of connected devices of a video capture and playback system 100 according to an example embodiment. For example, the video capture and playback system 100 may be used as a video security system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 (also referred to as camera 108) is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal feature is to capture images or video. In some example embodiments, the dedicated camera may perform functions associated with the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors, and one or more network interfaces. The memory device can include a local memory (e.g. a random access memory and a cache memory) employed during execution of program instructions. The processor executes computer program instructions (e.g., an operating system and/or application programs), which can be stored in the memory device.

In various embodiments, the processor 124 may be implemented by any processing circuit having one or more circuit units, including a digital signal processor (DSP), graphics processing unit (GPU), video processing unit or vision processing unit (both referred to as a VPU), embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116, and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, Internet), or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (e.g. server), each having one or more processors which may include graphics processing units (GPUs). The at least one workstation 156 may also include storage memory and includes at least one display device 184 and at least one user input device 186 (e.g.: mouse, keyboard, touchscreen). The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device 184 and at least one user input device 186 The client device 164 is operable to display on its display device 184 a user interface for displaying information, receiving user input, and playing back, including one or more video streams generated by one or more of video capture devices 108, as explained further below. For example, the client device 164 may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
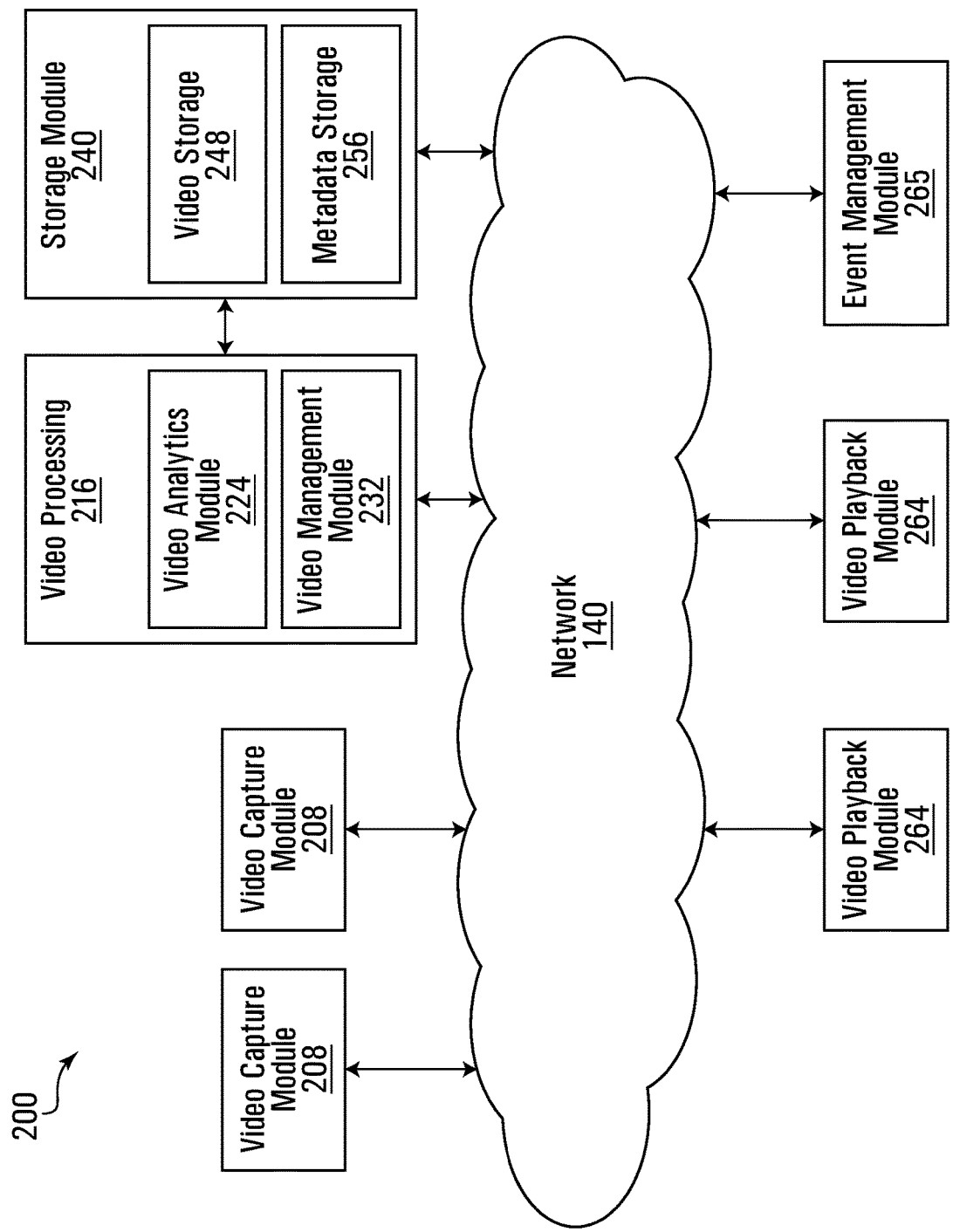
FIG. 2A is a block diagram of a set of operational modules of the video capture and playback system according to an example embodiment.

Referring now to FIG. 2A, therein illustrated is a block diagram of a set 200 of operational modules of the video capture and playback system 100, according to one example embodiment. The operational modules may be implemented in hardware, software or both on one or more of the devices of the video capture and playback system 100 as illustrated in FIG. 1.

The set 200 of operational modules includes at least one video capture module 208. For example, each video capture device 108 may implement a video capture module 208. The video capture module 208 is operable to control one or more components (e.g. sensor 116, etc.) of a video capture device 108 to capture images.

The set 200 of operational modules includes a subset 216 of image data processing modules. For example, and as illustrated, the subset 216 of image data processing modules may include a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. In the embodiments described herein, the determinations may include determining and assigning a priority level to detected events, and the output metadata may include characteristics relevant to the assigned priority level. Other examples of determinations made by the video analytics module 224 may include one or more of foreground/background segmentation, object detection, object tracking, object classification, virtual tripwire, anomaly detection, face detection, license plate recognition, identifying objects "left behind", monitoring objects (e.g. to protect from stealing), unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 may receive input from the video analytics module 224 and adjust compression/storage/transmission based on the content of the video, and can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules includes a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a display of client device 164.

The set of operational modules further includes at least one event management module 265. Event management module 265 is configured to assign priority levels to detected events. For example, video analytics module 224 may perform video analytics on image data obtained from cameras 108, which may include for example detecting movement of objects, detecting objects, and classifying objects. Event management module 265 may assign priority levels based on detected motion, or objects detected/classified, by video analytics module 224. In addition, event management module 265 may detect events based on the output of one or more sensors. For example, a proximity sensor may trigger an alarm in response to the proximity sensor detecting movement of a person or other object in its vicinity, and event management module 265 may in response detect that an alarm-level event has occurred. Other events may be based on, for example, any of the following: object detection, object tracking, object classification, virtual tripwire, anomaly detection, face detection, license plate recognition, people counting, object "left behind", object removed, unusual motion, appearance matching, face matching, facet matching, and business intelligence. Event management module 265 may furthermore assign a priority level of Alarm to the detected event, as described in further detail below. In some examples, the event management module 265 may be included in a client device. In some examples, the event management module 265 may be included in a server device. In still other examples, the event management module 265 may be implemented in some other manner, such as partly in a client device and partly in a server device.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
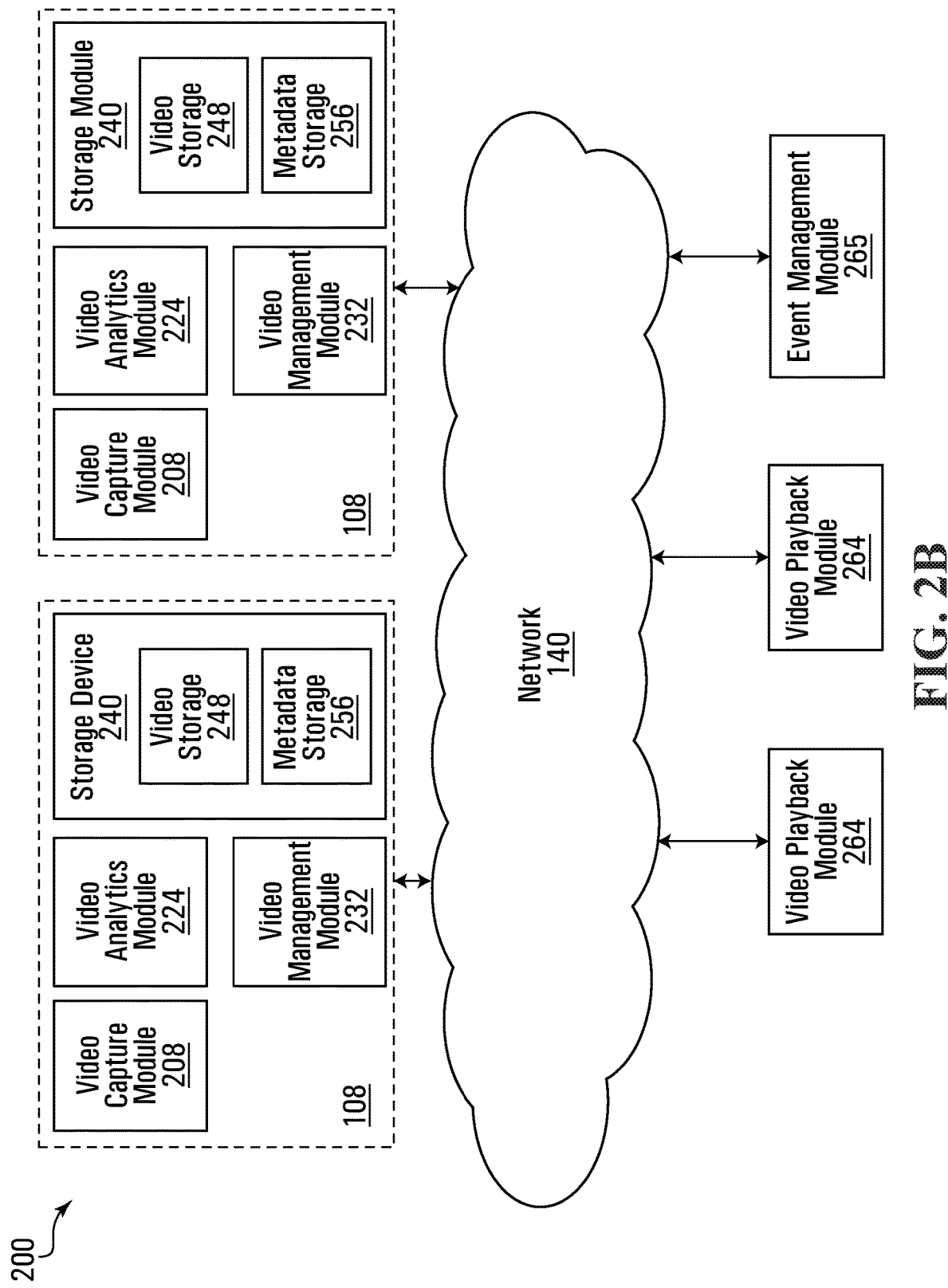
FIG. 2B is a block diagram of a set of operational modules of the video capture and playback system according to an example embodiment.

Referring now to FIG. 2B, therein illustrated is a block diagram of a set 200 of operational modules of the video capture and playback system 100 according to one particular example embodiment wherein the video analytics module 224, the video management module 232 and the storage module 240 are wholly implemented on the one or more image capture devices 108. Alternatively, the video analytics module 224, the video management module 232 and the storage module 240 are wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

Figure 3:
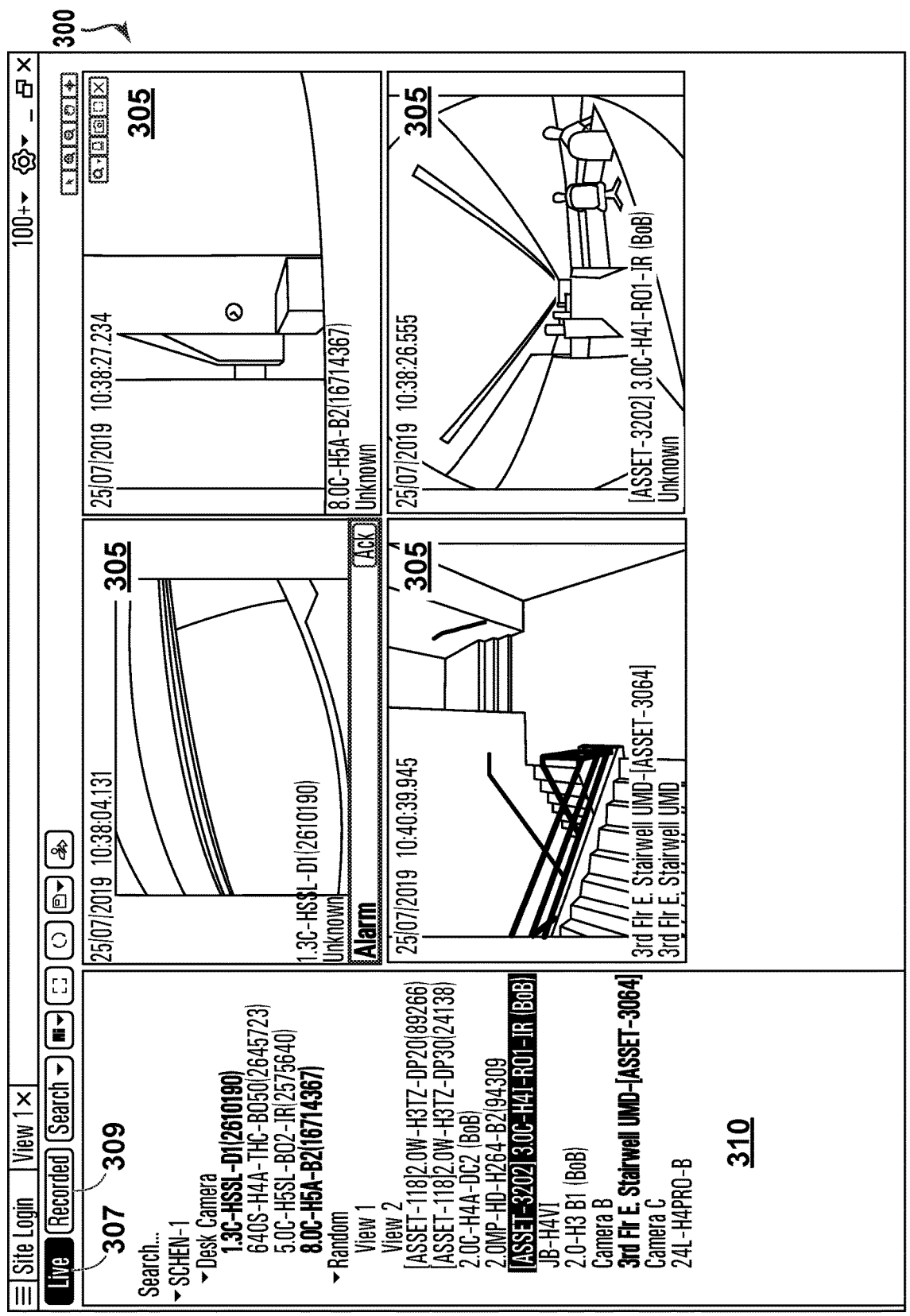
FIG. 3 is an illustration of a display showing a plurality of live video streams according to an example embodiment.

Turning to FIG. 3, there is shown a display 300, or graphical user interface (GUI), according to an embodiment of the disclosure. Display 300 may be shown on the display device 184 of client device 164 or workstation 156, and is used to show video generated by cameras 108 (in what follows, the video generated by a camera 108 may be referred to as a video stream). Event management module 265 and video playback module 264 may be used to control the selection and playback of video streams on display 300.

Display 300 comprises one or more display windows 305, each display window 305 comprising a portion of display 300. In some embodiments, the arrangement of display windows 305 may take various other forms, and there may be one, two, four, sixteen, or another number of display windows 305 shown on display 300.

In what follows, when the text refers to a video stream comprising an event, this means that the particular object or motion that triggered the event is comprised within the image data making up the video stream. For example, an object that is determined by video analytics module 224 to be moving may be constitute an event, as would be determined by the rules set in event management module 265. A video stream comprising such an event would include video of the object in motion. On the other hand, a video stream may simply be associated with a detected event, in the case where the event does not necessarily comprise movement of an object. For example, assume that an alarm is triggered in response to a door being opened, thereby providing access to a restricted room. In response to the triggering of the alarm, a video stream showing the interior of the restricted room (but not necessarily the door that was opened) may be displayed on display 300.

Each display window 305 is used to display a video stream generated by a camera 108. The video stream may include, or be associated with, one or more events detected by event management module 265. Each display window 305 may include text derived from metadata associated with the event, which identifies, for example, the type of event comprised in the video stream, a priority level assigned to the event, a location of camera 108 that captured or is associated with the event, as well as a timestamp associated with a current image being shown in display window 305.

FIG. 3 shows four display windows 305, each showing a live video stream (as opposed to recorded video), as selected using "Live" option 307, showing the video stream being produced by different cameras. Camera list 310 allows users to select cameras from which to view the live video streams in a window 305.

Figure 4:
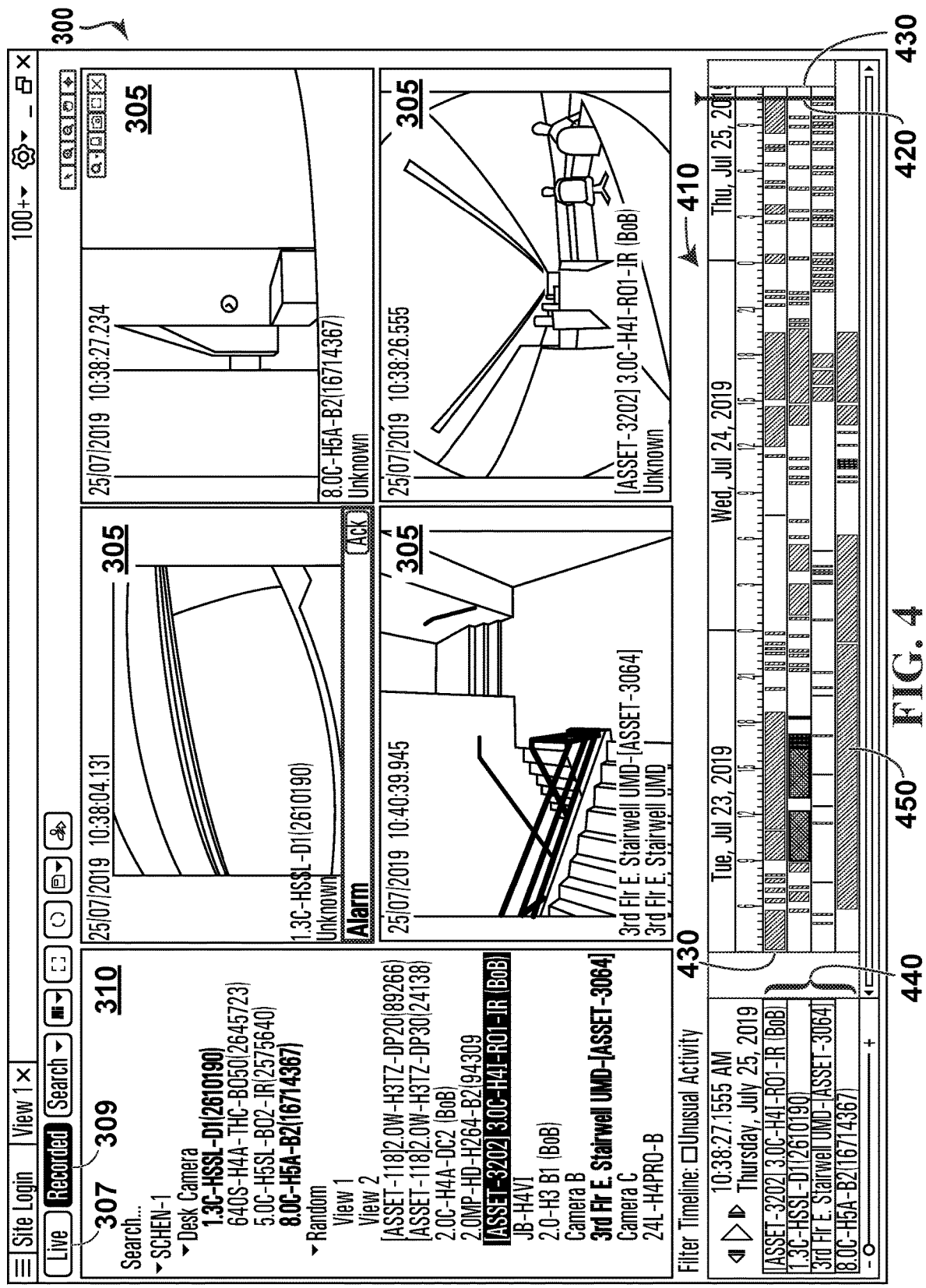
FIG. 4 is an illustration of a display showing a plurality of recorded video streams according to an example embodiment.

Referring to FIG. 4, timeline 410 is shown, and the video shown in display windows 305 correspond to timeline 410, i.e. the video shown in display windows 305 in FIG. 4 is recorded video, as selected using the "Recorded" option 309. Timeline 410 shows the date and time associated with the video streams shown in display windows 305. The current time selected is indicated by time bar 420. Each row 430 in timeline 410 corresponds to a selected camera indicated on camera column 440 and camera list 310 and the video shown in a display window 305. Timeline 410 includes shading 450 to indicate when events, such as motion, occurred. Shading can be colored coded to represent, for example an event occurring within the video stream.

Figure 5:
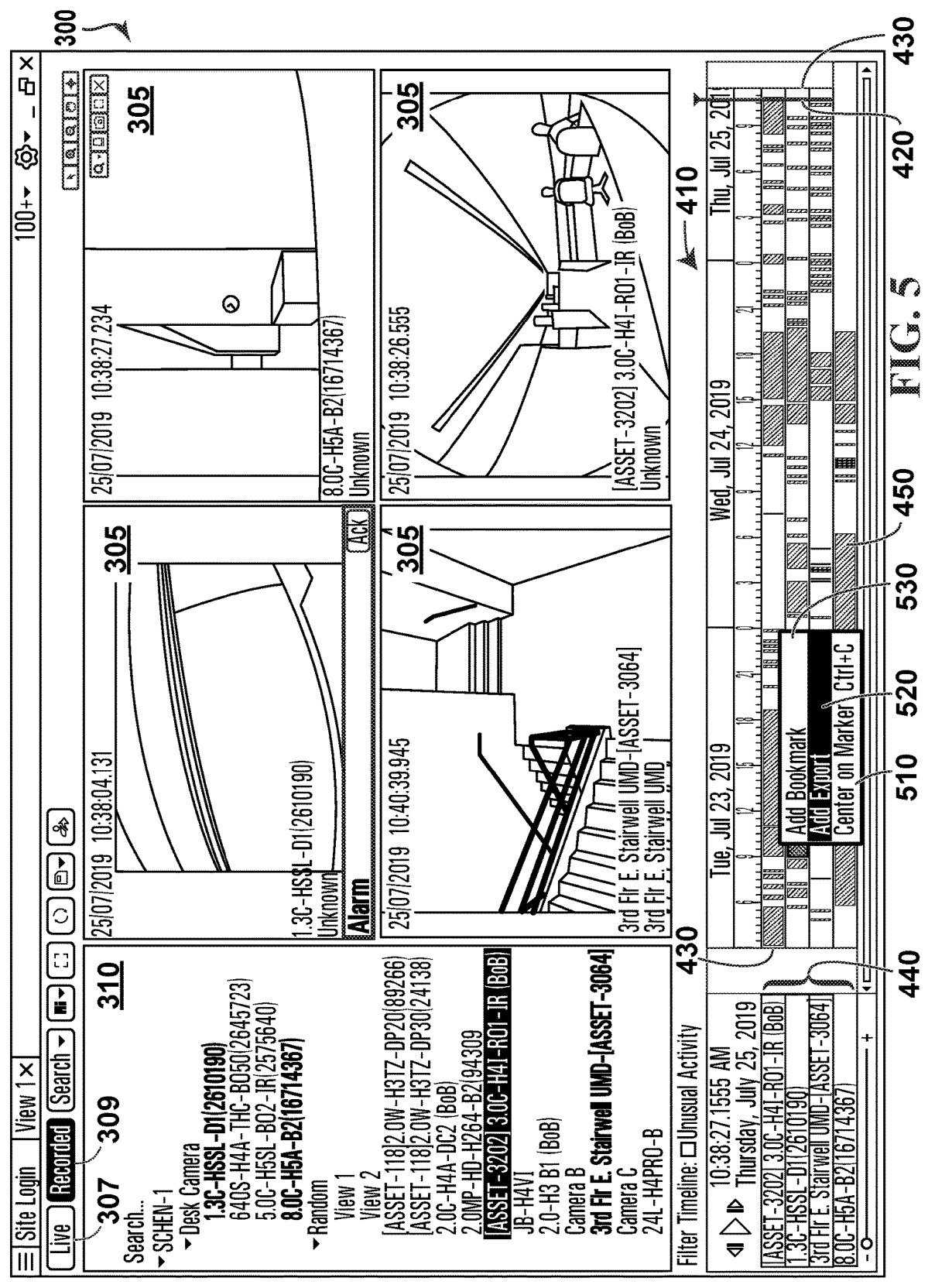

Referring to FIG. 5, there is shown display 300 further comprising pop up menu 510, which may be generated by, for example, the user right clicking on timeline 410. Pop up menu 510 can be generated through other means, for example, the user right clicking on a display window 305. Pop up menu 510 includes the option to "Add Bookmark" 530, which stores the time and date of the video in a bookmarks list, and to "Add Export" 520, which adds a video clip, which may be a video clip of a defined length greater than zero, or a snapshot, to a list of video clips 610 selected for export, as further explained below. A video clip is a portion of a recorded video stream, having at least two of: a beginning time and date, an ending time and date, and a defined length. The length may be zero in the case of a snapshot. In one an embodiment the user, when selecting "Add Export" 520 may be further prompted to selected either a snapshot or a longer video clip. In another embodiment pop up menu 510 may provide options for both "Add Video Clip for Export" and "Add Snapshot for Export". In another embodiment, each display window 305 includes a button, which may appear as a mouse or other pointer hovers over the display window 305. A user may select this button to select a snapshot or video clip and add the snapshot or video clip to the list of video clips 610.

Figure 6:
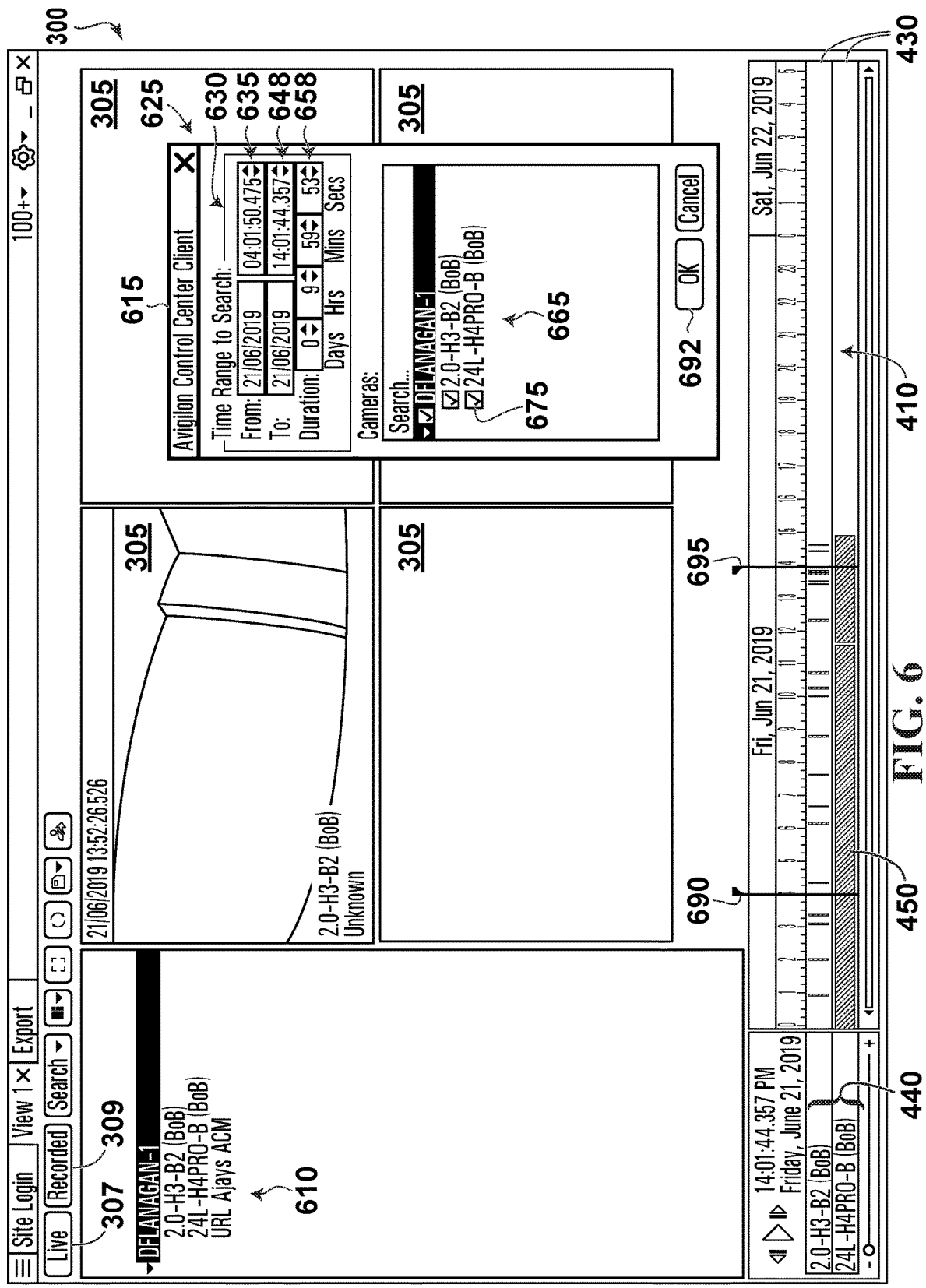
FIG. 6 is an illustration of a display showing a pop-up window after selection of a recorded video stream for export, according to an example embodiment.

Turning to FIG. 6, there is shown display 300 after a video clip has been selected for export. The video clips selected for export may be added to list of video clips 610 without requiring the user to do more than right click on the timeline or display window 305, and after selecting "add to Export" 520, then selecting the "OK" option 690. Thereby, a number of video clips can be added to list of video clips 610 quickly and easily.

A list of cameras 665 is also presented, and defaulted to, for example, the cameras currently presenting video shown in display windows 305. The user may use a check box 675 to deselect cameras and may search for additional cameras to add to list of cameras 665.

Clip information pop up 615 is then presented and contains default information which can be accepted by selection of the "OK" option 692. A user may also revise the default information presented. For example the time range 625 can be changed by increasing or decreasing the start date and time 635 or the end date and time 648, or the duration 658, which may, depending on preselected options, increase the start time, the end time, or both. The default start time, end time and duration may be based on a preset time e.g. a set number of hours from the time on which the image or timeline was clicked; or may be calculated using analytics, e.g. from the start to the end of a detected event occurring at the timeline or when the image was right clicked. A default name for the video clip will also be provided, typically based on the camera name and date/time.

In an embodiment these defaults may be adjustable, so for example, each clip will have a default length beginning and the selection time, and ending 2, 4, 6, or another number, minutes later.

Figure 7:
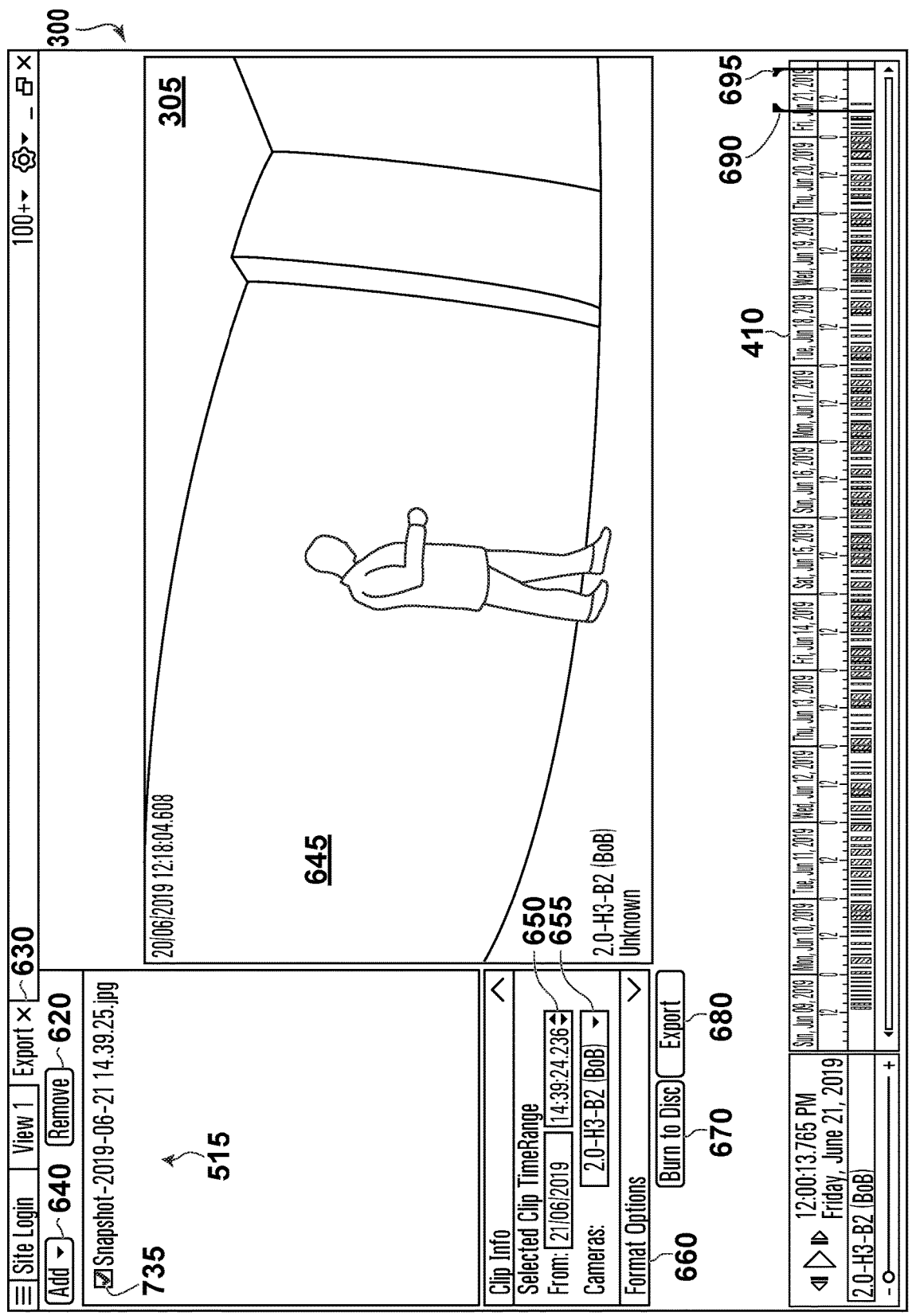
FIG. 7 is an illustration of a display showing an export options for a snapshot from a video stream according to an example embodiment.

Turning to FIG. 7, there is shown display 300 after selection of a snapshot, or a still image, from a video clip for export. Display 300 shows list 610 of video clips and snapshots selectable for export after selection of "Export" tab 630. Further video clips and snapshots may be added through the "Add" option 640, or video clips and snapshots may be deleted or removed through the "Remove" button, which when selected deletes the video clips marked through checkbox selection 735.

Display window 305 displays a video clip which is a still image, or "snapshot" 645 from the selected video clip. Information about the selected video clip is provided, including a time (or time range for a longer video clip) 650 and camera choice 655. Both time (or time range) 650 and camera choice 655 may be edited, so that the time may be made shorter or longer, and/or an alternative camera selected. In the case of snapshot 645, selection of a different time means snapshot 645 is replaced with a different image. The time range defaults to a specified time, so that a video clip, if the default is accepted in pop up 615, can be generated quickly and added to list 515; however using brackets 690, 695, the time range can be made shorter or longer. The camera choice 655 can be altered by selection of a drop down menu.

Video clips selected for export can be given a file format suing the "Format Options" 660 drop down menu, and can be burned to a disc via the "Burn to Disc" 670 option, or exported to a file using the "Export" option 680.

Figure 8:
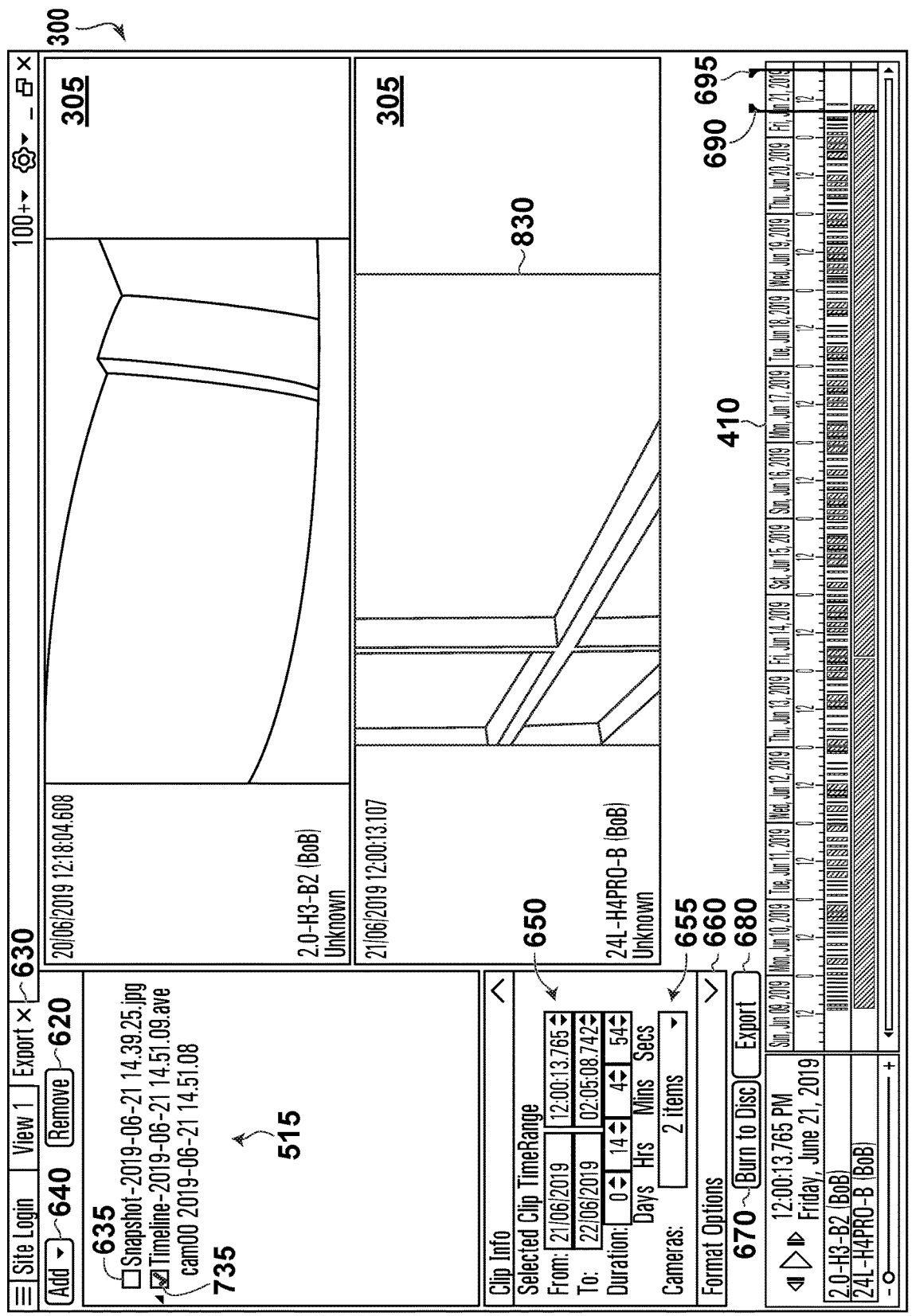
FIG. 8 is an illustration of a display showing the export options for a video clip from a video stream according to an example embodiment.

Turning to FIG. 8, there is shown display 300 after additional selection of video clips for export. An image 830 from each of the two video clips is displayed in respective display windows 305. Timeline 810 has been added to list 610, is indicated as selected in corresponding checkbox 735 and can be edited using time range 650 or brackets 690, 695. Camera choice 655 indicates two cameras have been chosen, in the example shown.

Figure 9:
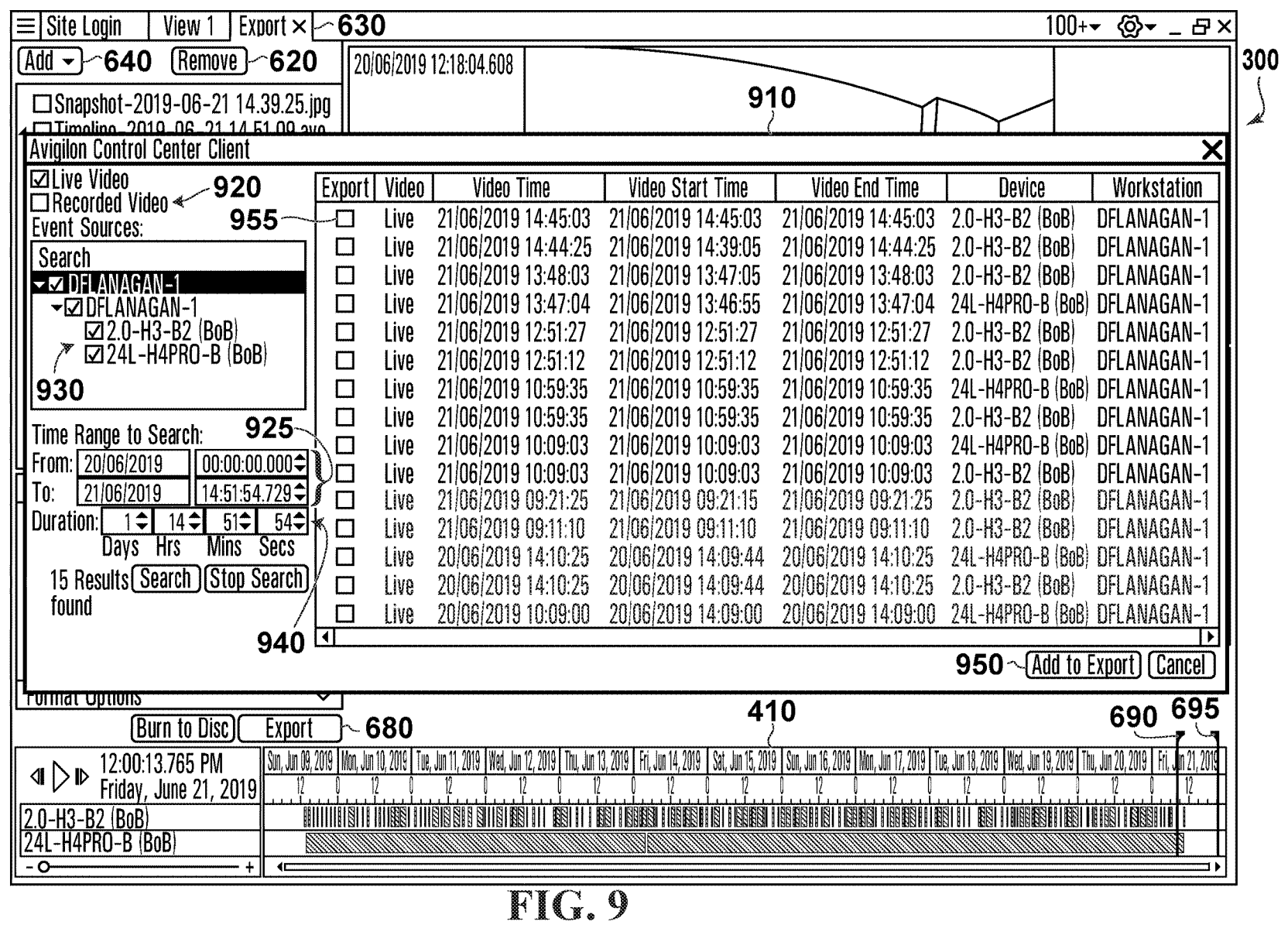

Referring to FIG. 9 a user may select video clips for export by viewing the user's history, which shows a list 910 of the video which the user has observed over a time range 925 selected by the user. As an example, a user can initialize a history search using a "Video History" option from the "Add" drop down button 640. The search results may be for live or recorded video, and may be filtered by cameras 930, duration 940, as well as time range 925. The video clips located may be selected via check boxes 955, and chosen for export using the "Add to Export" option 950.

Figure 10:
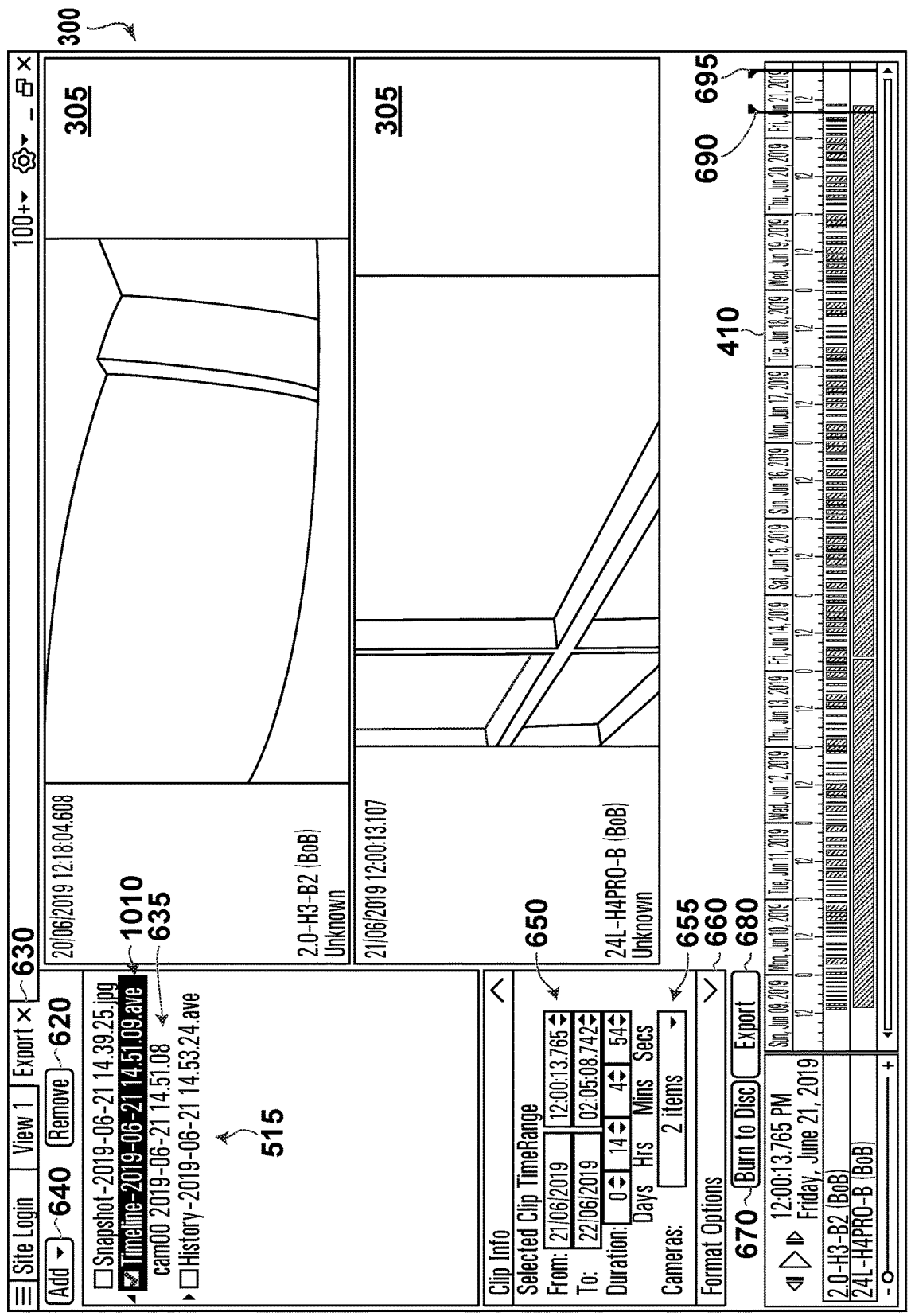
FIG. 10 is an illustration of a display showing the selection of video clips for export according to an example embodiment.

Referring to FIG. 10, "Timeline" 1010 has been selected from list 515, including video clips from two cameras.

Figure 11:
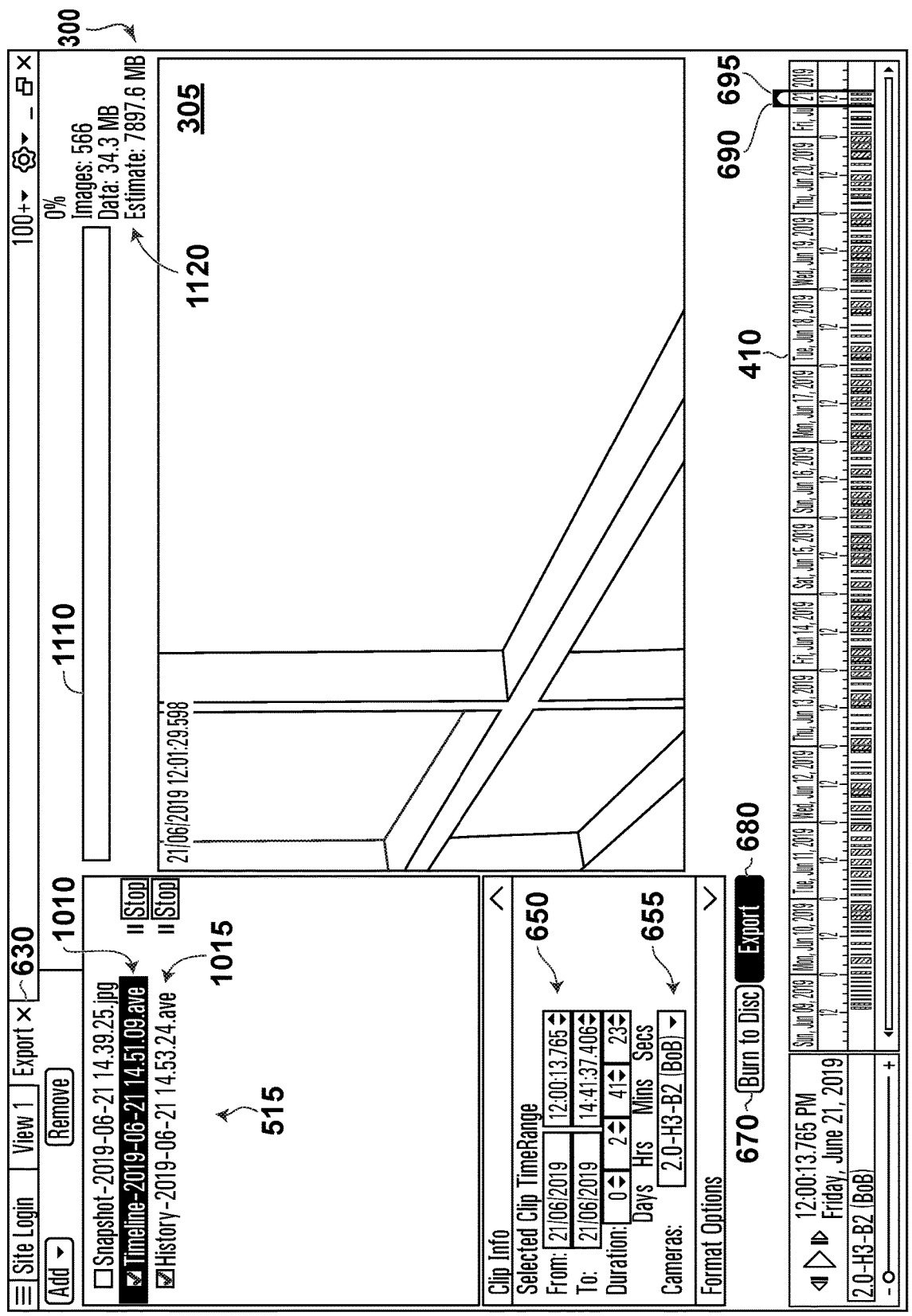
FIG. 11 is an illustration of a display showing the process of exporting video clips according to an example embodiment.

Referring to FIG. 11, "Timeline" 1010 and "History" 1015 have been selected for "Export" 680. When a user clicks the export button 680, a dialog appears to select their destination folder. The checked exports will be exported to the folder location and names as selected. If a user chooses to "Burn to Disc" option 670 the exports will be written to a CD/DVD/BDVD. The user can select to combine the selected video clips into a single video file or export the video clips as individual files. Bar 1110 shows the progress of the export to date, and information box 1120 shows information about the export, for example, the percentage complete (shown visually in bar 1110), the number of video frames (referred to as images), the amount of data, and the estimated size of the resultant file, and the size of the file(s) already written.

In this way files can be selected for particular folders, which may be named for and associated with particular investigations and contain video clips associated with such investigations.

Referring to FIG. 12, there is shown method 1200 for selecting video clips for export. At block 1210, one or more video files are selected for export. As described above, this can be done through a simple process, whereby right clicking on a display window 305 or timeline 410 causes a menu to appear including options to select a video clip or snapshot for export, and on selection of an option from the menu, at block 1220, a video clip is selected for list 515. From list 515, a video clip may be selected and edited for length and/or start and stop times (block 1230). Furthermore, additional camera views can be selected and added to list 515.

Still with reference to FIG. 12, and as described previously, one or more video clips may be selected from list 515 for export, (block 1240) and a destination, disc or folder, selected (block 1250). At block 1260, the files are exported to the selected destination.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot export video files, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of exporting one or more video clips, comprising:
   displaying one or more video streams from at least one security camera, wherein the one or more video streams are tagged as having been watched live by a user;
   selecting a first video clip from a video stream of the one or more video streams, the selected first video clip associated with a time;
   storing information associated with the selected first video clip, the information associated with the first video clip including the time and camera information from the at least one security camera that is associated with the video stream from the one or more video streams;
   displaying a list of video clips that includes the first video clip and a second video clip not tagged as having been watched live by the user; and
   exporting the video clips of the list to a file, wherein the file contains both video watched live and not watched live by the user.

2. The method of claim 1 wherein the information associated with the selected first video clip may be changed on selection of the video stream from the one or more video streams.

3. The method of claim 1 wherein the selection of the first video clip from the video stream of the one or more video streams comprises selecting a display of the video stream.

4. The method of claim 1 wherein the selection of the first video clip from the video stream of the one or more video streams comprises selecting a timeline associated with the video stream.

5. A system comprising:
   one or more security cameras configured to capture respective one or more video streams; and
   one or more processors communicative with memory having stored thereon computer program code configured when executed by the one or more processors to cause the one or more processors to perform a method comprising:
   displaying the one or more video streams, wherein the one or more video streams are tagged as having been viewed live by a user;
   selecting a first video clip from a video stream of the one or more video streams, the first video clip associated with a time;
   storing information associated with the selected first video clip, the information associated with the first video clip including the time and camera information from the one or more security cameras that is associated with the video stream from the one or more video streams;
   displaying a list of video clips that includes the first video clip and a second video clip not tagged as having been viewed live by the user; and
   exporting the video clips of the list to a file, wherein the file contains both video viewed live and not viewed live by the user.

6. The system of claim 5 wherein the information associated with the selected first video clip may be changed on selection of the video stream from the one or more video streams.

7. The system of claim 5 wherein the selection of the first video clip from the video stream of the one or more video streams comprises selecting a display of the video stream.

8. The system of claim 5 wherein the selection of the first video clip from the video stream of the one or more video streams comprises selecting a timeline associated with the video stream.

9. A non-transitory computer-readable medium having stored thereon computer program code configured when executed by one or more processors to cause the one or more processors to perform a method comprising:
   displaying one or more video streams from at least one security camera, wherein the one or more video streams are tagged as having viewed live by a user;
   selecting a first video clip from a video stream of the one or more video streams, the selected first video clip associated with a time;
   storing information associated with the selected first video clip, the information associated with the first video clip including, the time and camera information from the at least one security camera
that is associated with the video stream from the one or more video streams;
   displaying a list of video clips that includes the first video clip and a second video clip not tagged as having been viewed live by the user; and
   exporting the selected one or more video clips of the list to a file, wherein the file contains both video viewed live and not viewed live by the user.

10. The non-transitory computer-readable medium of claim 9 wherein the information associated with the selected first video clip may be changed on selection of the video stream from the one or more video streams.

11. The non-transitory computer-readable medium of claim 9 wherein the selecting of the first video clip from the video stream of the one or more video streams comprises selecting a display of the video stream.

12. The non-transitory computer-readable medium of claim 9 wherein the selecting of the first video clip from the video stream of the one or more video streams comprises selecting a timeline associated with the video stream.

\* \* \* \* \*